United States Patent [19]

Lettington

[11] 4,413,878
[45] Nov. 8, 1983

[54] IMAGING SYSTEMS

[75] Inventor: Alan H. Lettington, Malvern, England

[73] Assignee: The Secretary of State for Defence in Her Britannic Majesty's Government of the United Kingdom of Great Britain and Northern Ireland, London, England

[21] Appl. No.: 942,737

[22] Filed: Sep. 13, 1978

[30] Foreign Application Priority Data

Sep. 13, 1977 [GB] United Kingdom ............. 38158

[51] Int. Cl.³ ............................................. G02B 27/17
[52] U.S. Cl. ...................................... 350/6.7; 350/6.5; 350/6.8
[58] Field of Search ............................. 350/6.5, 6.7, 6.8

[56] References Cited

U.S. PATENT DOCUMENTS 3,602,572  8/1971  Norris, Jr. ................... 350/6.7
4,082,417  4/1978  Runciman et al. ............ 350/6.8

Primary Examiner—S. C. Buczinski
Attorney, Agent, or Firm—Pollock, Vande Sande & Priddy

[57] ABSTRACT

An imaging system for collecting radiation from a scene and producing an image of the scene includes first and second scanning rotors, said first scanning rotor having a set of $n_1$ plane mirrors which extend around the first rotor axis, said second scanning rotor having a set of $(n_1 + n_2)$ plane mirrors which extend around the second rotor axis (where $n_1$ and $n_2$ are integers), wherein adjacent mirrors in said first and second sets are inclined at different angles to the axes of first and second rotors respectively, and wherein the rotors are arranged such that radiation from said scene is reflected from one of said sets to the other, and means for driving the first rotor at $$\frac{(n_1 + n_2)}{n_1}$$

x speed of the second rotor.

3 Claims, 2 Drawing Figures

IMAGING SYSTEMS

The present invention relates to imaging systems and particularly, though not exclusively, to imaging systems which collect infra-red radiation from a scene and produce an image of the scene by means of a rotating scanner.

A known imaging system employs a rotating prism which has reflecting facets and a flapping mirror for sweeping a scanned image of a scene onto a detector which is responsive to the radiation from the scene. Such a system requires accurate synchronization between the rotating prism and the flapping mirror.

Another known system employs a rotor with facets which are inclined so as to produce a banded scan. In this system it is necessary to have a large number of plane surfaces and consequently a large rotor to produce a satisfactory image.

According to the present invention an imaging system includes first and second scanning rotors having sets of $n_1$ and $(n_1+n_2)$ plane mirrors, respectively, (where $n_1$ and $n_2$ are integers) the sets of mirrors extending around the rotor axes, wherein the adjacent mirrors in each set are inclined at different angles to the rotor axis and wherein the rotors are arranged such that radiation from a scene may be reflected from one set to the other and thence to a detector, and means for driving the first rotor at $$\frac{(n_1 + n_2)}{n_1}$$

x the speed of the second rotor.

In a preferred form of the invention, the rotors are of truncated pyramidal configuration, the one facing the other.

The rotors may be driven at constant speeds or one or both rotors driven intermittently to achieve a particular scanning pattern.

The system may include means for producing an a-focal image of the scene at one of the rotors.

The mirrors of each set may be attached to a rotor body or the mirrors may be integrally formed with the rotor body by, for example, polishing plane faces of the rotor.

The invention will now be described by way of example only, with reference to the accompanying drawings of which:

Figure 1:
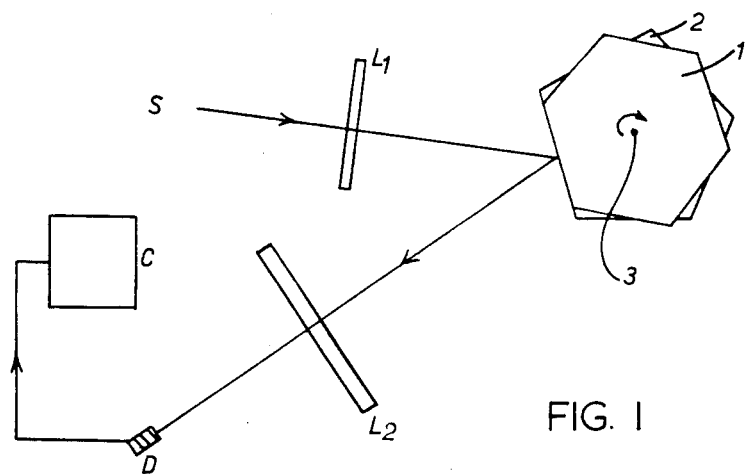
FIG. 1 is a schematic plan view of an imaging system.

The imaging system shown in FIG. 1 includes an a-focal lens system comprising a lens $L_1$ which focuses infra red radiation from a source S on a six sided scanning rotor 1 which reflects the radiation from its sides, constituting plane mirrors, onto a five sided scanning rotor 2 which then reflects the radiation from its sides via a lens $L_2$ onto a single detector D composed of cadmium mercury telluride whose output is connected to a cathode ray tube C to form a display of the source S in a conventional manner.

The scanning rotors 1,2 are driven by an electric motor via a gearbox (not shown) and are rotated in the same direction at constant speeds $W_1$ and $W_2$, respectively, where the speed ratio $W_1/W_2$ equals the ratio $$\frac{N_2}{N_1} = \frac{5}{6}$$

(where $N_1$ and $N_2$ are the number of sides of the rotors 1 and 2 respectively). The rotors are machined from aluminum bar and the sides are highly polished planar reflectors. Successive sides of each rotor are inclined at progressively increasing angles to the rotor axis as shown in Table 1 below. The total angle that the incident radiation is reflected through is $$2\pi\left(\frac{1}{N_1} + \frac{1}{N_2}\right)$$

where $N_1$ and $N_2$ are the number of sides on the rotors 1 and 2.

TABLE 1

| (i) | Rotor 1 | | 2.5 | 5 | 7.5 | 10 | 12.5 | 15 | 2.5 | 5 | 7.5 | 10 | 12.5 | 15 | 2.5 | 5 | 7.5 |
|---|---|---|---|---|---|---|---|---|---|---|---|---|---|---|---|---|---|
| (ii) | Rotor 2 | | 0.5 | 1.0 | 1.5 | 2.0 | 2.5 | 0.5 | 1.0 | 1.5 | 2.0 | 2.5 | 0.5 | 1.0 | 1.5 | 2.0 | 2.5 |
| (iii) | Angular Difference (Degrees) | | 2.0 | 4.0 | 6.0 | 8.0 | 10.0 | 14.5 | 1.5 | 3.5 | 5.5 | 7.5 | 12.0 | 14.0 | 1.0 | 2.5 | 5.0 |
| (iv) | Coinciding - pair number | 0 | 1 | 2 | 3 | 4 | 5 | 6 | 7 | 8 | 9 | 10 | 11 | 12 | 13 | 14 | 15 |
| (v) | Scanning pattern | | | | | X | | | | X | | X | | X | | | | |
| | | | | X | | | X | | | X | | | X | | | | | X |
| | | | X | | | X | | | X | | | | X | | | | X | |
| | | X | | | | | | | | | | X | | | X | | | |
| (i) | Rotor 1 | 10 | 12.5 | 15 | 2.5 | 5 | 7.5 | 10 | 12.5 | 15 | 2.5 | 5.0 | 7.5 | 10.0 | 12.5 | 15 | |
| (ii) | Rotor 2 | 0.5 | 1.0 | 1.5 | 2.0 | 2.5 | 0.5 | 1.0 | 1.5 | 2.0 | 2.5 | 0.5 | 1.0 | 1.5 | 2.0 | 2.5 | |
| (iii) | Angular Difference (Degrees) | 9.5 | 11.5 | 13.5 | 0.5 | 2.5 | 7.0 | 9.0 | 11.0 | 13.0 | 0 | 4.5 | 6.5 | 8.5 | 10.5 | 12.5 | |
| (iv) | Coinciding - pair number | 16 | 17 | 18 | 19 | 20 | 21 | 22 | 23 | 24 | 25 | 26 | 27 | 28 | 29 | 30 | |
| (v) | Scanning pattern | X | | | X | | | | | | | | | X | | | |
| | | | | | | | | | | X | | | X | | | | |
| | | | | | X | | | X | | | X | | | | | | |
| | | | X | | | X | | | X | | | X | | | | X | |

In table 1 lines (i) and (ii) give the angles of each mirror with respect to a fixed datum for the rotors 1, 2, each column containing the angles for an aligned pair of mirrors. Line (iii) gives the difference between the angles in (i) and (ii) for the aligned pairs.

Figure 2:
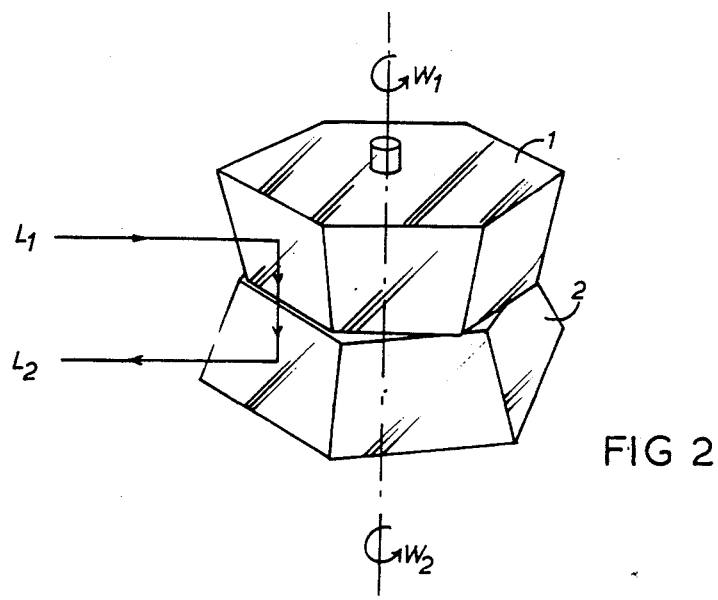
FIG. 2 is a perspective view of a pyramidal rotor pair of the system shown in FIG. 1.

As the rotors 1, 2 rotate, radiation is reflected from a first pair of sides which are aligned and then by subsequent aligned pairs until the fifth pair has come into alignment. The next reflection in the sequence is from the sixth side of rotor 1 to the first side on rotor 2. The sequence continues for alignments of 30 pairs of sides, which constitutes one cycle which is then repeated. Table 1 above shows alignments of rotor sides over one cycle. The display produced by the system shown in FIGS. 1 and 2 has 30 bonds, each bond corresponding to an aligned pair of sides.

The sides of the rotor are only exactly aligned at the center of each line scan and they are in error by $$\beta\pi\left(\frac{1}{N_1} - \frac{1}{N_2}\right)$$

at the extremities of the scan, where $\beta$ is the scan efficiency. The result of this alignment error is antisymmetric distortion in the display. Hence it is important that $$\left(\frac{1}{N_1} - \frac{1}{N_2}\right)$$

in minimized.

I claim:

1. An imaging system for collecting radiation from a scene and producing an image of the scene, said system including first and second scanning rotors mounted on a common rotational axis, said first scanning rotor having a set of $n_1$ plane mirrors which extend around the first rotor axis, said second scanning rotor having a set of $(n_1+n_2)$ plane mirrors which extend around the second rotor axis (where $n_1$ and $n_2$ are integers), wherein adjacent mirrors in said first and second sets are inclined at different angles to the axes of said first and second rotors respectively, and wherein the rotors are arranged such that radiation from said scene is reflected from one of said sets to the other, and means for driving the first rotor at $$\frac{(n_1 + n_2)}{n_1}$$

x speed of the second rotor.

2. An imaging system as in claim 1 wherein each of said rotors is of truncated pyramidal configuration.

3. An imaging system as in claim 1 or claim 2 including means for producing an a-focal image of the scene on one of said rotors.

* * * * *